United States Patent [19]

Hirai et al.

[11] 4,283,266

[45] Aug. 11, 1981

[54] METHOD AND APPARATUS FOR CONTROLLING HALOGEN ION CONCENTRATION IN A PHOTOGRAPHIC PROCESSING SOLUTION

[75] Inventors: Hiroyuki Hirai; Sachio Matsushita; Isao Tsuyuki; Kazumi Watase, all of Minami-ashigara, Japan

[73] Assignee: Fuji Photo Film Co., Ltd., Minami-ashigara, Japan

[21] Appl. No.: 92,776

[22] Filed: Nov. 8, 1979

Related U.S. Application Data

[62] Division of Ser. No. 935,391, Aug. 21, 1978, Pat. No. 4,207,157.

[30] Foreign Application Priority Data

Aug. 30, 1977 [JP] Japan ............................... 52/104011

[51] Int. Cl.[3] ........................ B01D 13/02; C25B 9/00; C25B 15/08

[52] U.S. Cl. .................................... 204/263; 204/228; 204/301

[58] Field of Search .................... 204/180 P, 301, 151, 204/195 M, 1B, 263

[56] References Cited

U.S. PATENT DOCUMENTS 2,708,658 5/1955 Rosenberg .................. 204/180 P X
4,089,760 5/1978 Ono ................................. 204/151 X

*Primary Examiner*—Howard S. Williams
*Attorney, Agent, or Firm*—Sughrue, Mion, Zinn, Macpeak and Seas

[57] ABSTRACT

The concentration of halogen ions in a photographic developer is controlled at an almost constant value by determining the concentration of halogen ions in the developer by detecting the change in electric potential caused by the addition of silver ions to the solution, and controlling the electrical current supplied to a halogen ion removing means, such as an electrodialysis or an electrolysis unit having an anion exchange membrane, based on the result of the determination of halogen ions. By this method the amount of complementary developer added to a fatigued developer solution can be greatly reduced.

6 Claims, 4 Drawing Figures

METHOD AND APPARATUS FOR CONTROLLING HALOGEN ION CONCENTRATION IN A PHOTOGRAPHIC PROCESSING SOLUTION

This is a division of application Ser. No. 935,391, filed Aug. 21, 1978, now U.S. Pat. No. 4,207,157.

BACKGROUND OF THE INVENTION

1. Field of the Invention

This invention relates to a method and apparatus for controlling the halogen ion concentration in a photographic processing solution.

2. Description of the Prior Art:

Various photographic processing solutions are used for developing exposed silver halide photographic film. These solutions have optimum compositions or formulations according to the kind of photographic film or material to be processed, such as color film, general black and white film, printing film, etc. Furthermore, each developer performs best when the concentration of each chemical component is kept in a specific range. However, as the development progresses some of the chemical components are partially consumed and others are increased by the intermingling of chemical components catering from the developed photographic film, whereby the composition of the developer is gradually changed and its developing ability or effectiveness is reduced. For example, the developing agent is gradually reduced by oxidation during the developing of silver halide, but the halogen ions are dissolved in the developer by the reduction of silver halide to increase gradually the concentration thereof.

To regenerate the photographic developer for repeated use, a method is generally employed in which a supplementary composition is added to the fatigued developer after a certain amount of film has been processed. However, adding the supplementary composition may supply lost components, but cannot reduce the components increased by the development. Therefore, the undesirable components increase with development use or time and gradually accumulate in spite of repeated regeneration, until the point is reached at which the developer cannot be regenerated by the addition of such supplementary compositions. The photographic processing solution is then discarded and replaced with a fresh solution.

In general, in adding the supplementary composition the volume of the processing solution is maintained at a constant value by removing or discarding the same amount of the solution as the amount of supplementary composition supplied, by overflowing or the like, and this somewhat reduces the increased undesirable components. However, in order to reduce the components to desired concentrations, a large amount of the processing solution must be discarded.

In, for example, a film containing mainly silver chlorobromide emulsion, chlorine and bromine ions increase with usage in the developer. In a film containing mainly silver iodobromide emulsion, the iodine ions released in the developer are exchanged with the bromine ions of silver bromide to increase the bromine ions. Among halogen ions, bromine ions have a great influence on the processing ability of a developer, and an increase of the bromine ion concentration in a developer greatly decreases the developing speed. Other ions, such as those of chlorine, increase in concentration development, but such increase does not have the bad influence on processing ability as do bromine ions and hence cause no trouble.

A developer also contains various ions at high concentrations, and hence it is undesirable from a pollution prevention standpoint to discard the developer without first processing it to a non-toxic state to satisfy legally regulated waste water standards. For such treatment large scale apparatusses and high costs are required.

Thus, some means for regenerating the developing ability of a fatigued developer without discarding it, thereby enabling the repeated use of the developer, has been highly sought after.

In general, silver ions in a fix solution, the concentration of which is desirably as low as possible, and Fe(II) ions in a bleach solution, which are desirably completely reoxidized to Fe(III) ions, can be comparatively easily regenerated. Also, a fatigued developing agent can be easily regenerated by supplying the decreased component by its reduced amount.

Halogen ions, particularly bromine ions, have a large influence on the properties of photographic materials even if the amounts thereof vary only slightly. As mentioned above, halogen ions may be removed by known electrodialysis or electrolysis techniques using an anion-exchange membrane. However, with these known methods the developer must be recontrolled to a definite concentration before use after removing the halogen ions.

In addition, in photographic processing solutions other than the developer, for example a mono-bath type blix solution used for processing color photographic materials, halogen ions such as bromine ions also increase in concentration with use. In these other photographic processing solutions the influence of the bromine ion concentration increase on the processing ability may be low compared with that of the developer, but if the bromine ion concentration increases too much it reduces the fixing speed. Therefore, in regenerating these other photographic processing solutions it is preferable to remove the bromine ions in addition to supplying some supplemental solution.

SUMMARY OF THE INVENTION

A primary object of this invention is to provide a method and apparatus for automatically controlling the halogen ion concentration in a fatigued photographic processing solution with reduced processing ability as a result of processing silver halide photographic materials, by selectively removing the increased halogen ions to reduce their concentration to a definite value necessary to maintain a desired processing ability, thus regenerating the solution for repeated use without discarding it. According to the invention, this object is realized by determining the halogen ion concentration in a photographic processing solution by the addition of silver ions, and controlling the removal of halogen ions in response to the determination result. An appropriate implementing apparatus comprises;

(a) means for sampling a solution, (b) means for determining the halogen ions in the sampled solution by the change in its electrical potential or conductivity caused by the addition of silver ions, (c) means for removing halogen ions, and (d) means for controlling the halogen ion removing means in response to the output of the halogen ion determining means.

DETAILED DESCRIPTION OF THE PREFERRED EMBODIMENTS

Figure 1:
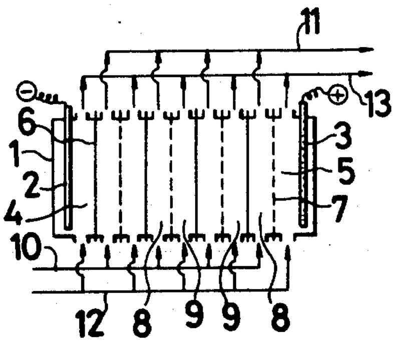
FIG. 1 and FIG. 2 are schematic side views showing an embodiment of the halogen ion removing means of this invention.

The invention will now be explained in detail by reference to the controlling of the halogen ion concentration of a developer.

Laid Open Japanese Patent Application No. 5436/'71 discloses a method of determining halogen ions in a developer using a halogen ion sensitive electrode system composed of a silver/silver halide electrode and a mercurous sulfate reference electrode. However, in this method the background potential deviates owing to the action of the reducing or developing agent, which reduces the accuracy of the determination.

On the other hand, in the present invention a silver ion titration method is employed for determining halogen ions and the influences of the components dissolved from the existing developer components and silver halide photographic materials.

The determination of halogen ions in the present invention is accomplished employing a silver ion addition method. An external method may be practiced wherein silver ions are added beforehand as an aqueous silver nitrate solution, etc., or an internal method may be used wherein silver ions are supplied from a silver electrode by a controlled electrolysis current.

The concentration of an aqueous silver nitrate solution or the addition speed of the solution in the external method must be determined by the halogen ion concentration in a solution to be measured, but when, for example, the concentration of halogen ions in a solution to be measured is $4\times10^{-5}$ mol, it is preferred that the concentration of an aqueous silver nitrate solution to be added be 0.05 normal and the addition speed thereof be about 0.3 ml./min., although other values may of course be employed in this invention. In the internal method the controlled current is 10–100 milliamperes, preferably 30-50 milliamperes, which may depend upon the halogen ion concentration. In general, if the electric current is too low (i.e., lower than few milliamperes), halogen ions attach to the silver ion-generating electrode to reduce the efficiency of generating silver ions, while if the current is too high (i.e., higher than few hundreds milliamperes), the accuracy of the determination is reduced.

It is also important to measure the developer and reagents (an aqueous silver nitrate solution, etc.,) with high accuracy. It is a feature of this invention that the end point of the reaction is detected by sensing the change in electric potential of the reaction system by means of a halogen ion sensitive electrode system composed of a silver/silver halide electrode or a silver electrode and a mercurous sulfate reference electrode, and the amount of halogen ions is determined by accurately calculating the time from the initiation of the reaction to the end point thereof.

In conventional automatic analysis a method is generally employed in which the time when the electric potential changes by a predetermined value after the initiation of the titration is defined as the end point of the titration, as shown by, for example, a pH-stat. However, in a photographic processing composition it is difficult to apply such a conventional method since the electric potential at the equivalent point of the titration is not constant because of the chemical reaction of the components dissolved from silver halide photographic materials or the processing composition.

In the present invention the progress of the chemical reaction (the precipitation reaction of silver halide) is delayed to increase the accuracy of the determination and hence the change ($\Delta E$) in potential per unit time ($\Delta T$). That is, the time differential coefficient $\Delta E/\Delta T$ is low. It is also a feature of this invention to use a novel circuit for detecting the percentage of potential change which removes noise exhibiting a large time differential coefficient.

The concentration indicating system is composed of a time counter, which counts the time from the initiation of titration to the end point of the reaction to control the electric current to a halogen ion removing means according to the count number. As practical examples, when the count number is 0–120 seconds the current is 0 ampere, when the count number is 121–140 seconds the current is 1 ampere, when the count number is 141–160 seconds the current is 2 amperes, when the count number is 161–180 seconds the current is 3 amperes, etc., although other ranges may of course be employed.

The halogen ion removing means is controlled by a signal from a halogen ion determination means, removes excessive halogen ions, and maintains the concentration at a constant value. An electrodialysis or an electrolysis apparatus using an anion exchange membrane can be employed as the halogen ion removing means.

As an example of an electrodialysis apparatus which may be used, reference is made to Laid Open Japanese Patent Application No. 97,432/'76. The apparatus is composed of an ion exchange membrane dialysis cell having a number of desalting and concentrating chambers each partitioned alternately by an anion exchange membrane and a cation exchange membrane between an anode and a cathode, and the electrodialysis is carried out by pouring developer in the desalting chambers as shown in FIG. 1 of the accompanying drawings.

Thus, in FIG. 1 plural desalting chambers 8 and concentrating chambers 9 are formed between a cathode 2 and an anode 3 in an ion exchange membrane type dialysis cell 1 by partitioning alternately plural anion exchange membranes 7 and plural cation exchange membranes 6.

A cathodic chamber 4 and an anodic chamber 5 are also formed by partitions of ion exchange membranes disposed adjacent to the cathode and the anode, respectively.

A developer is supplied to each desalting chamber 8 from a supply line 10 and, after being electrodialyzed, is discharged through a line 11. An aqueous sodium sulfate solution is supplied to the concentrating chambers 9, the anodic chamber 5 and the cathodic chamber 4 through a supply line 12 and after electrodialysis, is discharged through a line 13.

The material for the cathode 2 may be iron, nickel, stainless steel, etc., and the material for the anode 3 may be graphite, magnetite, platinum, platinum-plated titanium, etc. There is no particular restriction about the cation exchange membranes 6, but anion exchange membranes selectively permeating monovalent anions, in particular bromine ions and iodine ions are desirably used.

The cathodic chamber 4, the anodic chamber 5, and the concentrating chambers 9 are supplied with an aqueous alkali solution such as an aqueous sodium hydroxide solution and an aqueous potassium hydroxide solution, an aqueous solution of a salt such as sodium sulfate, or a solution of an acid such as sulfuric acid. The concentration of these solutions may be about 0.1 normal as the lower limit, and although there is no particular upper limit of the concentration, a sufficient result is usually obtained at a concentration lower than one normal.

A developer is supplied into the desalting chambers 8, which may be connected in parallel as illustrated in FIG. 1 or in series.

When a fatigued developer having a reduced processing faculty is subjected to electrodialysis in the desalting chambers 8, the bromine and iodine ions in the developer transfer through the anion exchange membranes 7 into the concentrating chambers 9 or the anodic chamber 5, through which they are removed from the system. Also, the cations such as, for example, sodium ions, in the developer transfer through the cation exchange membranes 6 into the concentrating chamber 9 or the cathodic chamber 4, through which they are removed from the system. Thus, the concentration of bromine ions, iodine ions, and cations is reduced in the desalting chambers, while the concentration of these ions is increased in the concentrating chambers.

A suitable electrolysis apparatus using an anion exchange membrane is disclosed in Laid Open Japanese Patent Application No. 26,542/'76. This apparatus is composed of an electrolytic cell having a cathodic chamber and an anodic chamber partitioned by an anion exchange membrane between a cathode and an anode, and a developer to be regenerated is electrolyzed in the cathodic chamber of the cell while an aqueous electrolyte solution is poured in the anodic chamber and a direct current is passed between the two electrodes.

Figure 2:
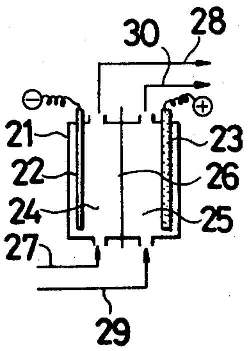

Thus, as shown in FIG. 2, a cathodic chamber 24 and an anodic chamber 25 are formed in an anion exchange membrane electrolytic cell 21 by the partition of an anion exchange membrane 26 disposed in the cell. A developer to be regenerated is supplied to the cathodic chamber from a line 27, an electrolyte solution is supplied into the anodic chamber through a line 29, and the developer is then electrolyzed by passing a direct current between the anode 23 and the cathode 22. The developer thus regenerated by the electrolysis is discharged through a line 28 and the electrolyte solution is discharged through another line 30.

The material for the cathode 22, the anode 23, the anion exchange membrane 26, and the electrolyte solution and concentration may be as described above for the electrodialysis apparatus.

When a fatigued developer having a reduced processing faculty is electrolyzed in the cathodic chamber 24 of the cell, the bromine ions and iodine ions in the developer transfer through the anion exchange membrane 26 into the anodic chamber 25, through which they are removed from the system. Thus, the concentration of these ions is reduced in the cathodic chamber and increased in the anodic chamber.

The apparatus employed is connected to the developer tank of an automatic processer by a conduit or is used individually as a means for removing halogen ions controlled by the signal from the halogen ion determination means.

The invention will now be explained in more detail by referring to the embodiment illustrated in the accompanying drawings.

Figure 3:
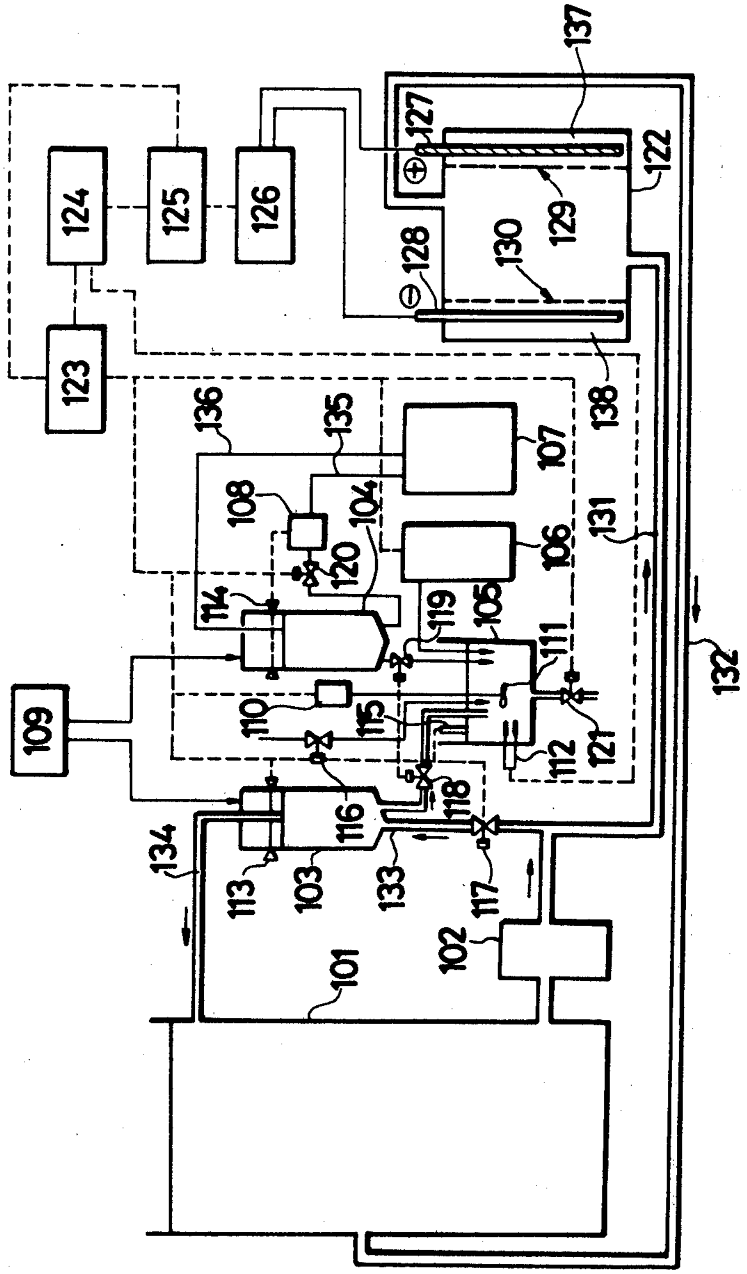
FIG. 3 is a schematic diagram of an apparatus for controlling the halogen ion concentration of a developer according to this invention.

FIG. 3 shows an apparatus for controlling the halogen ion concentration of a developer composed of an automatic silver ion titration means, an automatic halogen ion determination means, and a halogen ion concentration controlling means. The automatic silver ion titration means is composed of means for measuring a sample developer and reagents, and a titration cell. The automatic halogen ion determination means is composed of a halogen ion-sensitive electrode system for detecting the halogen ion concentration of the solution in the titration cell, and operating means for indicating the amount of halogen ions by detecting the change of the potential of the electrode. The halogen ion concentration controlling means is composed of a halogen ion removing means controlled by the signal from the automatic halogen ion determination means.

Each of the above means will now be explained in detail. In FIG. 3 a processing solution or a developer placed in a tank 101 is introduced into a halogen ion removing means 122 through a pipe 131 by a liquid pump 102. Part of the processing solution is sent from the pipe 131 to a sample measuring vessel 103 through an electromagnetic valve 117 and a sampling pipe 133. A reagent (e.g., an aqueous sulfuric acid solution) stored in a reagent solution tank 107 is, when an electromagnetic valve 120 opens, supplied to a reagent measuring vessel 104 through a pipe 135 by a pump 108. After the sample and the reagent solution are introduced in the vessels 103 and 104 to the levels determined by electroluminescent diodes 113 and 114 respectively, the excessive sample and reagent solution are sent back to the processing solution tank 101 and the reagent solution tank 107 through return pipes 134 and 136 by the action of a compressor 109, which makes for an accurate measurement of the sample and the reagent.

Water is stored in a measuring cell 105 before titration, and at titration the water is completely discharged through an electromagnetic valve 121. Thereafter, an electromagnetic valve 118 or 119 opens to add thereto the sample or the reagent solution, either separately or simultaneously. The solution is mixed by a stirrer 111 driven by a motor 110. After waiting several minutes to stabilizing the indication potential, a silver nitrate titration reagent solution is added to the measuring cell 105 from an automatic supply tank 106.

The halogen ion concentration in the solution to be titrated is continuously detected by a halogen ion sensitive electrode 112 composed of a silver/silver halide electrode or a silver electrode and a mercurous sulfate reference electrode, and the titration is continued until a unit 124 detects the end point. After the titration is finished the valve 121 opens, the solution containing precipitates in the cell is discarded, and thereafter an electromagnetic valve 116 opens and fresh washing water is introduced into the cell. The amount of washing water is determined by the level sensed by a platinum liquid level detecting electrode 115. The washing water thus introduced into the cell is stirred for a predetermined period of time by motor 110 and is then discharged from the cell. This operation is repeated several times, and then returns to the initial step.

A series of these operations are performed by a timing unit 123 and a control unit 125. If the titration time is determined by the aforesaid manner, a definite current corresponding to the titration time is applied between an anode 127 and a cathode 128 of a halogen ion removing means 122 from a current control unit 126. Thus, the halogen ions in the processing solution introduced into the removing means 122 transfer through an anion exchange membrane 129 into an anodic chamber 137, while cations transfer through a cation exchange 130 into a cathodic chamber 138. The processing solution with its reduced halide ion concentration is sent back to the processing solution tank 101 through a return line 132. A series of these operations are performed by sequential instructions from the timing unit 123.

Figure 4:
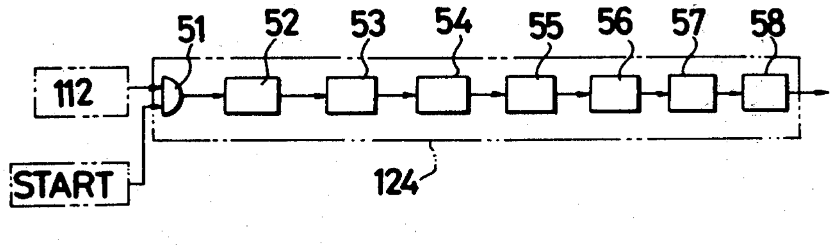
FIG. 4 is a block diagram showing the halogen ion determining means in this invention.

The end point of the titration is detected by the unit 124, which senses the change in the halogen ion concentration of the reaction liquid in the measurement cell 105 as a change in potential, introduces it to a differential circuit through a noise filter, and outputs the change of the potential ratio to detect the end point of the titration. A block diagram thereof is shown in FIG. 4. The signal from the halogen ion detection electrode 112 is fed to an amplifier 52 through a gate circuit 51, amplified therein to a predetermined level, fed through a low pass filter 53 to remove the noise, differentiated by a primary differential circuit 54, amplified by an amplifier 55, fed through a second low pass filter 56 to remove any new noise, and differentiated by a secondary differential circuit 57. The zero cross point is then detected by a comparator 58, whose output indicates the end point of the titration.

Since the time from the initiation of the titration to its end point corresponds to the amount of halogen ions of the processing solution to be measured in the measuring cell, by measuring the time and controlling the current to the halogen ion removing means, the concentration of halogen ions can be accurately controlled.

By the method of this invention a large amount of developer can be regenerated with low equipment cost and at a substantial savings in the chemicals for the developer. In the method of this invention a processing solution may be treated in a cyclical flow system proceeding from a processing tank to a halogen ion determined means, then to a halogen ion removal means, and finally back to the processing tank, and these steps may also be practiced in a batch system. The method can also be applied to both black and white and color processing solutions.

EXAMPLE

A color developer having the composition shown in Table 1 was continuously processed for 10 days using an automatic processor equipped with a halogen ion concentration control means (determination was by a silver nitrate titration method and the removal was by electrodialysis) of this invention, and the result was compared with using only a conventional supplemental solution having the composition shown in Table 2. The compositon of the developers and the photographic properties were the same in both cases as shown in Table 3.

In Table 3, Fog and Dmax show the fogs and the maximum densities in three colors of the photographic materials processed with the developers. The amount of supplemental solution used with the method of this invention was 1/5 the amount thereof in the conventional method. Also, the result obtained by measuring the content of potassium bromide in the developer every day showed that the developer remained stable as shown in Table 4.

TABLE 1

| | Fresh Solution | Complementary Solution (150 ml./m$^2$) |
|---|---|---|
| Sodium sulfite | 2.0 g/liter | 2.8 g/liter |
| Potassium bromide | 0.4 g/liter | 0 g/liter |
| Developing agent | 4.0 g/liter | 7.9 g/liter |
| Hydroxylamine sulfate | 2.5 g/liter | 3.5 g/liter |
| pH (sodium carbonate buffer solution) | 10.20 g/liter | 10.65 g/liter |

TABLE 2

| | Complementary solution (750 ml/m$^2$) |
|---|---|
| Sodium sulfite | 2.4 g/liter |
| Potassium bromide | 0 |
| Developing agent | 5.0 g/liter |
| Hydroxylamine sulfate | 2.8 g/liter |
| pH (sodium carbonate buffer solution) | 10.35 g/liter |

TABLE 3

| | | Fresh Solution | Conventional Complemental System | Invention Method |
|---|---|---|---|---|
| Fog | Blue | 0.08 | 0.09 | 0.09 |
| | Green | 0.15 | 0.15 | 0.15 |
| | Red | 0.12 | 0.12 | 0.12 |
| Dmax | Blue | 2.09 | 2.06 | 2.07 |
| | Green | 2.48 | 2.50 | 2.50 |
| | Red | 2.58 | 2.59 | 2.58 |

TABLE 4

| After processing | Amount of potassium bromide (g/liter) |
|---|---|
| the 1st day | 0.40 |
| 2nd day | 0.41 |
| 3rd day | 0.40 |
| 4th day | 0.40 |
| 5th day | 0.39 |
| 6th day | 0.40 |
| 7th day | 0.41 |
| 8th day | 0.39 |
| 9th day | 0.40 |
| 10th day | 0.41 |

What is claimed:

1. An apparatus for controlling the concentration of halogen ions in a photographic processing solution, comprising:
   (a) means for sampling a photographic processing solution,
   (b) means for determining concentration of the halogen ions in the sampled processing solution according to the change in electric potential caused by the addition of silver ions,
   (c) means for removing halogen ions from the processing solution, and
   (d) means for controlling the halogen ion removing means in response to the output of the halogen ion determining means.

2. The apparatus of claim 1, wherein the halogen ion removing means is an electrodialysis unit.

3. The apparatus of claim 1, wherein the halogen ion removing means is an electrolysis unit having an anion exchange membrane.

4. The apparatus of any one of claims 1-3, wherein the halogen ion removing means removes said halogen ions from said processing solution at a rate determined by an energizing current, and wherein said controlling means controls the magnitude of said current in accordance with the determined halogen ion concentration.

5. The apparatus according to claim 1, wherein said means for determining comprises:

means for combining a reagent solution with the sampled photographic processing solution to form a composite solution;

means for adding a silver nitrate solution to said composite solution to perform a silver nitrate titration on said composite solution;

means for detecting the end point of the titration; and timing means for measuring the duration of said titration.

6. The apparatus according to claim 5, wherein said means for detecting the end point of said titration comprises a halogen ion sensitive electrode.

* * * * *